(12) United States Patent
Katoh

(10) Patent No.: US 7,890,784 B2
(45) Date of Patent: Feb. 15, 2011

(54) POWER SUPPLYING MODE SWITCHING CONTROLLER, IMAGE FORMING APPARATUS, AND IMAGE READING APPARATUS

(75) Inventor: Katsuhiko Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 897 days.

(21) Appl. No.: 11/740,596

(22) Filed: Apr. 26, 2007

(65) Prior Publication Data

US 2007/0260358 A1 Nov. 8, 2007

(30) Foreign Application Priority Data

Apr. 28, 2006 (JP) ............................. 2006-126031

(51) Int. Cl.
*G06F 1/00* (2006.01)
(52) U.S. Cl. .................... 713/323; 713/300; 713/320
(58) Field of Classification Search .................. 713/323
See application file for complete search history.

(56) References Cited

U.S. PATENT DOCUMENTS

| | | | | | |
|---|---|---|---|---|---|
| 5,692,128 | A | * | 11/1997 | Bolles et al. ................ | 709/224 |
| 6,000,035 | A | * | 12/1999 | Matsushima et al. ........ | 713/320 |
| 6,256,520 | B1 | * | 7/2001 | Suzuki ....................... | 455/572 |
| 6,408,396 | B1 | * | 6/2002 | Forbes ....................... | 713/323 |
| 6,981,161 | B2 | * | 12/2005 | Koo .......................... | 713/310 |
| 7,095,437 | B1 | * | 8/2006 | Hatakeyama ............. | 348/231.7 |
| 7,389,433 | B2 | * | 6/2008 | Sunagawa et al. ........... | 713/320 |
| 7,574,614 | B2 | * | 8/2009 | Koo .......................... | 713/310 |
| 2007/0233907 | A1 | * | 10/2007 | Yoshikawa et al. ............ | 710/26 |

FOREIGN PATENT DOCUMENTS

| | | |
|---|---|---|
| JP | 2000-141821 | 5/2000 |
| JP | 2000-261515 | 9/2000 |
| JP | 2005-303978 | 10/2005 |

* cited by examiner

*Primary Examiner*—Suresh K Suryawanshi
(74) *Attorney, Agent, or Firm*—Oblon, Spivak, McClelland, Maier & Neustadt, L.L.P.

(57) ABSTRACT

A power supplying mode switching controller is disclosed. The power supplying mode switching controller includes a main controller which controls an image forming apparatus, a power supply circuit which has a normal mode and a power saving mode, an I/O controller which switches the power supply circuit to the normal mode when a factor returning to the normal mode is generated in the power saving mode, and an SD interface to which an SD card is attached. The I/O controller includes a first attaching change detecting circuit which detects an attaching change of the SD card to the SD interface, and when the first attaching change detecting circuit detects the attaching change of the SD card to the SD interface in the power saving mode, the I/O controller switches the power supply circuit to the normal mode and informs the main controller of the attaching change of the SD card.

20 Claims, 9 Drawing Sheets

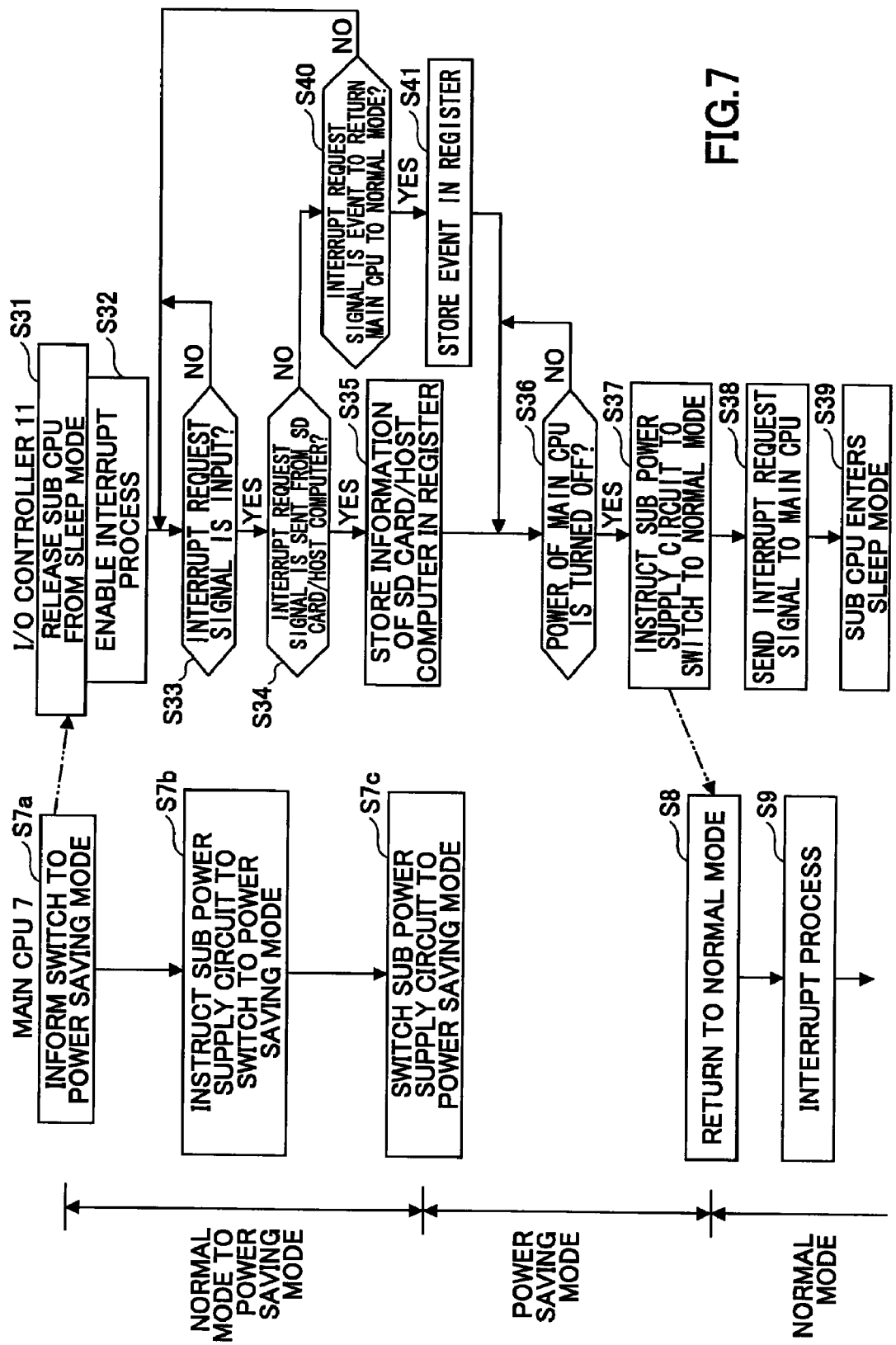

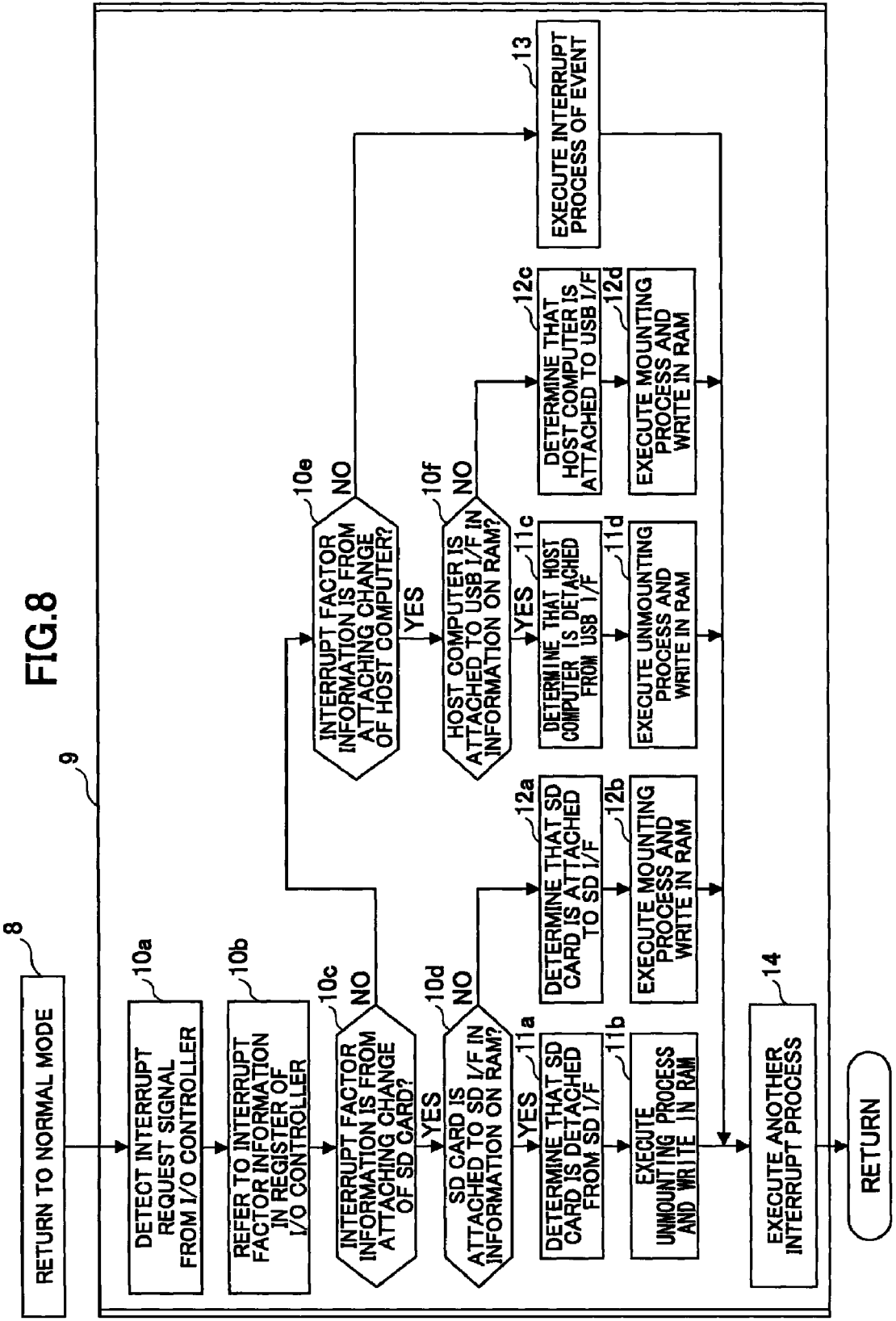

POWER SUPPLYING MODE SWITCHING CONTROLLER, IMAGE FORMING APPARATUS, AND IMAGE READING APPARATUS

BACKGROUND OF THE INVENTION

1. Field of the Invention

The present invention generally relates to a power supplying mode switching controller, an image forming apparatus using the power supplying mode switching controller, and an image reading apparatus using the power supplying mode switching controller.

2. Description of the Related Art

In an image processing apparatus such as a printer, a scanner, and a copier in which low cost operations by low power consumption are realized, at least two power supplying modes of a normal mode and a power saving mode are provided. In the normal mode, the apparatus can perform functions, for example, printing by supplying power to all the functions. In the power saving mode, power is only supplied to circuits for detecting user operations of the apparatus and detecting access from an external device and for storing information necessary to be maintained; the power is cut off to a circuit which executes printing (scanning) when the printing (scanning) is not being executed. A controller in the apparatus generally provides a main CPU and a sub CPU. The main CPU controls printing (scanning) operations and enters a power cutoff mode (sleep mode) in the power saving mode when printing is not being executed. The sub CPU enters an idle mode (sleep mode) in the normal mode, and detects a signal to return to the normal mode in the power saving mode.

In Patent Document 1, a network controller is disclosed. In the network controller, in order to realize low power consumption, in addition to a CPU, a sub CPU is provided. When the normal mode is switched to the power saving mode, the sub CPU processes packets in a network and prevents packet loss (communication loss).

[Patent Document 1] Japanese Laid-Open Patent Application No. 2005-303978

When the sub CPU detects a factor for returning to the normal mode from the power saving mode of the apparatus, the sub CPU switches from the power saving mode to the normal mode. However, in order that the sub CPU detects the factor to return to the normal mode in the power saving mode, the sub CPU must provide a device driver for an I/F to which the factor for returning to the normal mode is applied on software (operating program) in the sub CPU, which device driver is similar to that in the main CPU. Consequently, a time period and labor hours for developing software for the sub CPU are required, and a program storing area in the sub CPU is increased. With this, the cost is increased and the power consumption is increased.

For example, the apparatus controls a detachable recording medium by software (operating program) on the main CPU. In the apparatus, the software operating on the main CPU must recognize information to determine whether the detachable recording medium is changed or a new recording medium is attached to the apparatus in the power saving mode (low power consumption mode). However, in the power saving mode, in order to realize the low power consumption mode, since the main CPU is in the idle mode (sleep mode), or in a power cutoff mode, the main CPU cannot determined whether the detachable recording medium is attached/detached to/from the I/F. For example, in a case where the normal mode is switched to the power saving mode while the detachable recording medium is being loaded, when the detachable recording medium is detached and a new detachable recording medium is attached in the power saving mode, the software on the main CPU must recognize that the detachable recording medium is changed.

In addition, the apparatus controls a communication I/F which can make a host computer wait (for example, a PC (personal computer)) to operate. In the apparatus, the software operating on the main CPU must recognize whether a host computer is attached to the communication I/F or detached from the apparatus. However, in the power saving mode, in order to realize the low power consumption mode, since the main CPU is in the idle mode, or in the power cutoff mode, the main CPU cannot determined whether the host computer is attached to the communication I/F or detached from the communication I/F. For example, in a case where the normal mode is switched to the power saving mode while the host computer is being attached to the communication I/F, when the host computer is detached from the communication I/F and a new host computer is attached to the communication I/F, the software on the main CPU must recognize that the host computer being attached to the communication I/F is changed.

In order to inform the software on the main CPU of information whether the detachable recording medium is changed or the host computer is changed in the power saving mode, it is possible that the software on the sub CPU detects that the detachable recording medium is detached and a new detachable recording medium is attached and inspects data in the detachable recording medium, or the software on the sub CPU detects that the host computer is detached and is attached again and executes data communication with the host computer attached to the communication I/F. In this case, a device driver is required on the sub CPU which device driver can read/write data from/on the detachable recording medium on the software of the sub CPU or can execute data communication with the host computer attached to the communication I/F. However, when low power consumption is required, the ROM capacity must be a necessary minimum to store software. In addition, in order to achieve low power consumption, since a CPU having low throughput and low operating frequency is used as the sub CPU, time to determine whether the detachable recording medium is changed or to execute data communication with the host computer attached to the communication I/F becomes long.

In addition, after the software on the sub CPU returns the main CPU to the normal mode by determining that the detachable recording medium is changed or the host computer attached to the communication I/F is changed, the software on the main CPU must execute a mounting process and an unmounting process of the above information on a memory corresponding to the change.

SUMMARY OF THE INVENTION

In a preferred embodiment of the present invention, there is provided a power supplying mode switching controller, an image forming apparatus using the power supplying mode switching controller, and an image reading apparatus using the power supplying mode switching controller in which a detecting process of generation of a factor for returning to a normal mode from a power saving mode by a sub CPU is simple, the amount of software for returning to the normal mode from the power saving mode in the sub CPU is decreased and a memory area required by the amount of the software is decreased, time loss retuning to the normal mode in determination of changing a detachable recording medium or of changing a host computer is decreased by the software of the sub CPU, and labor hours for developing the software on the sub CPU are reduced.

Features and advantages of the present invention are set forth in the description that follows, and in part will become apparent from the description and the accompanying drawings, or may be learned by practice of the invention according to the teachings provided in the description. Features and advantages of the present invention will be realized and attained by a power supplying mode switching controller, an image forming apparatus using the power supplying mode switching controller, and an image reading apparatus using the power supplying mode switching controller particularly pointed out in the specification in such full, clear, concise, and exact terms as to enable a person having ordinary skill in the art to practice the invention.

To achieve one or more of these and other advantages, according to one aspect of the present invention, there is provided a power supplying mode switching controller. The power supplying mode switching controller includes a main controller which controls an image forming apparatus, a power supply circuit which has a normal mode for supplying an operating voltage to the image forming apparatus including the main controller and a power saving mode for cutting off the operating voltage to a part of the image forming apparatus including the main controller, an I/O controller which switches the power supply circuit to the normal mode when a factor for returning to the normal mode is generated in the power saving mode of the power supply circuit, and a detachable recording medium interface to which a detachable recording medium is attached in the I/O controller. The I/O controller includes a first attaching change detecting circuit which detects an attaching change of the detachable recording medium to the detachable recording medium interface. When the first attaching change detecting circuit detects the attaching change of the detachable recording medium to the detachable recording medium interface in the power saving mode, the I/O controller switches the power supply circuit to the normal mode and informs the main controller of the attaching change of the detachable recording medium. The main controller renews information in a memory to be attaching change information.

According to another aspect of the present invention, there is provided an image forming apparatus which forms an image on a recording medium by using a plotter and/or a scanner. The image forming apparatus includes a main power source which supplies an operating voltage to all elements in the image forming apparatus, a main controller which controls the image forming apparatus, a power supply circuit which has a normal mode for supplying the operating voltage to all the elements of the image forming apparatus and a power saving mode for cutting off the operating voltage to a part of the image forming apparatus, an I/O controller which switches the power supply circuit to the normal mode when a factor for returning to the normal mode is generated in the power saving mode of the power supply circuit, a detachable recording medium interface to which a detachable recording medium is attached in the I/O controller, or a communication device interface capable of making operations of a communication device wait, to which the communication device is attached in the I/O controller. The I/O controller includes a first attaching change detecting circuit which detects an attaching change of the detachable recording medium to the detachable recording medium interface. When the first attaching change detecting circuit detects the attaching change of the detachable recording medium to the detachable recording medium interface in the power saving mode, the I/O controller switches the power supply circuit to the normal mode and informs the main controller of the attaching change of the detachable recording medium. The main controller renews information in a memory to be attaching change information, and the I/O controller includes a second attaching change detecting circuit which detects an attaching change of the communication device to the communication device interface. When the second attaching change detecting circuit detects the attaching change of the communication device to the communication interface in the power saving mode, the I/O controller switches the power supply circuit to the normal mode and informs the main controller of the attaching change of the communication device. The main controller renews information in the memory to be attaching change information.

According to another aspect of the present invention, there is provided an image reading apparatus which reads an image by using a scanner. The image reading apparatus includes a main power source which supplies an operating voltage to all elements in the image reading apparatus, a main controller which controls the image reading apparatus, a power supply circuit which has a normal mode for supplying the operating voltage to all the elements of the image reading apparatus and a power saving mode for cutting off the operating voltage to a part of the image reading apparatus, an I/O controller which switches the power supply circuit to the normal mode when a factor for returning to the normal mode is generated in the power saving mode of the power supply circuit, a detachable recording medium interface to which a detachable recording medium is attached in the I/O controller, and a communication device interface capable of making operations of a communication device wait to which the communication device is attached in the I/O controller. The I/O controller includes a first attaching change detecting circuit which detects an attaching change of the detachable recording medium to the detachable recording medium interface. When the first attaching change detecting circuit detects the attaching change of the detachable recording medium to the detachable recording medium interface in the power saving mode, the I/O controller switches the power supply circuit to the normal mode and informs the main controller of the attaching change of the detachable recording medium. The main controller renews information in a memory to be attaching change information, and the I/O controller includes a second attaching change detecting circuit which detects an attaching change of the communication device to the communication device interface. When the second attaching change detecting circuit detects the attaching change of the communication device to the communication interface in the power saving mode, the I/O controller switches the power supply circuit to the normal mode and informs the main controller of the attaching change of the communication device. The main controller renews information in the memory to be attaching change information.

EFFECT OF THE INVENTION

According to an embodiment of the present invention, a main controller can determine whether a detachable recording medium is attached to a detachable recording medium interface or a communication device is attached to a communication device interface by a device driver (software) on the main controller by returning to a normal mode.

In addition, an I/O controller detects only an attaching change of the detachable recording medium or the communication device to the corresponding interfaces which change is a factor for returning to the normal mode from the power saving mode and does not confirm the contents of the detachable recording medium or does not execute data communication with the communication device. Therefore, the amount of codes of a program in the I/O controller can be decreased and the memory area can be reduced. With this, an image forming apparatus using a power supplying mode switching controller can be realized at low cost and low power consumption.

BRIEF DESCRIPTION OF THE DRAWINGS

Features and advantages of the present invention will become more apparent from the following detailed description when read in conjunction with the accompanying drawings, in which:

FIG. 7 is a flowchart showing switching processes from the normal mode to the power saving mode and returning processes from the power saving mode to the normal mode in a main CPU and an I/O controller in the image forming apparatus; and FIG. 8 is a flowchart showing the interrupt processes shown in FIG. 4B in detail after the main CPU is returned to the normal mode from the power saving mode.

DESCRIPTION OF THE PREFERRED EMBODIMENT

Best Mode of Carrying Out the Invention

The best mode of carrying out the present invention is described with reference to the accompanying drawings.

Figure 1:
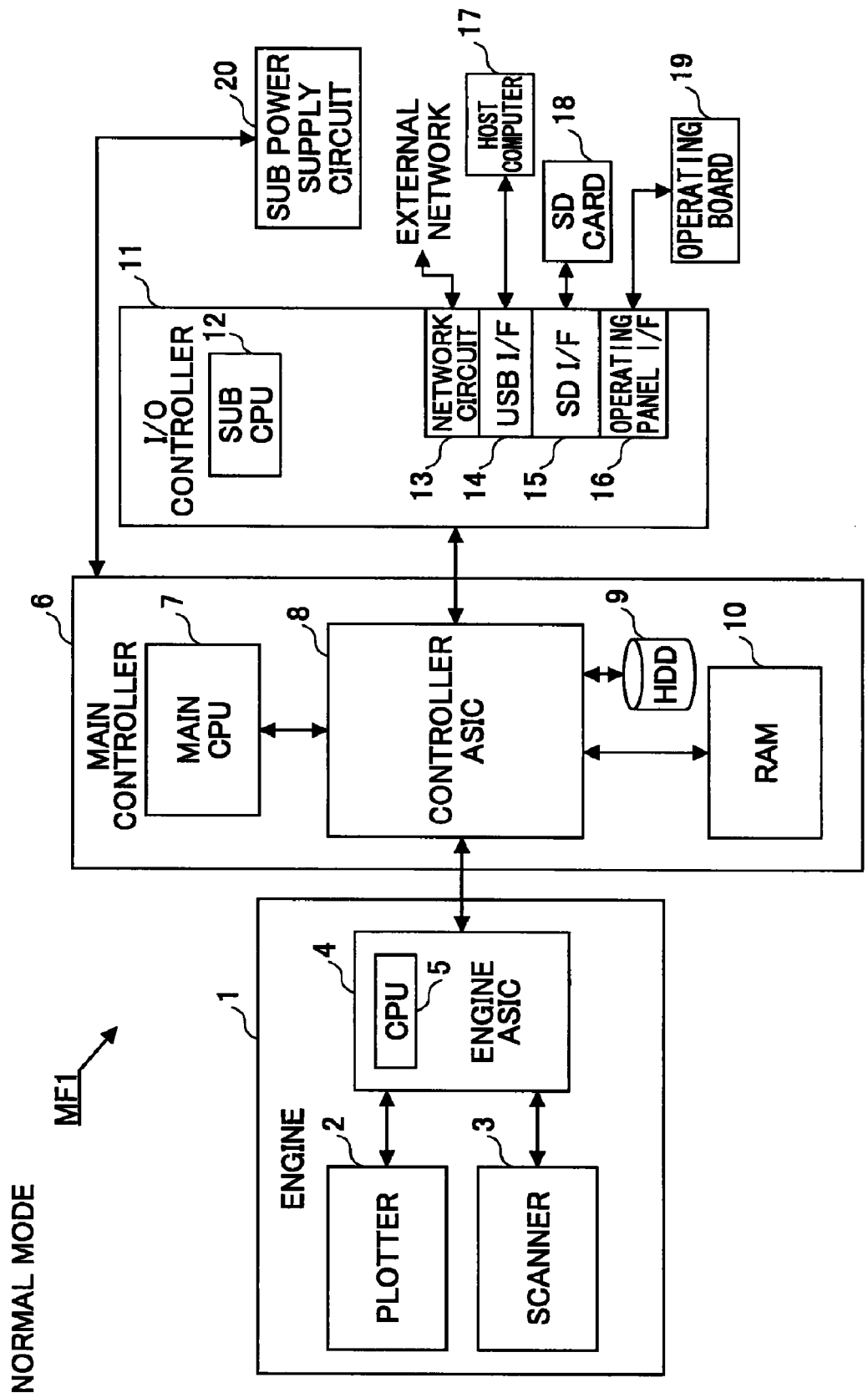
FIG. 1 is a block diagram showing an image forming apparatus according to an embodiment of the present invention.

FIG. 1 is a block diagram showing an image forming apparatus according to an embodiment of the present invention. In FIG. 1, as the image forming apparatus, a digital copying apparatus MF1 is used, and the digital copying apparatus MF1 is an MFP (multifunctional peripheral). However, the image forming apparatus is not limited to the digital copying apparatus MF1. As shown in FIG. 1, the digital copying apparatus MF1 includes an engine 1, a main controller 6, an I/O controller 11, and a sub power supply circuit 20. The engine 1 includes a plotter 2 which writes an image on paper, a scanner 3 which reads an image on a document, and an engine ASIC (application specific integrated circuit) 4. The engine ASIC 4 controls the plotter 2 and the scanner 3, and is connected to the main controller 6 via a general-purpose bus such as a PCI (peripheral component interconnect) bus. The main controller 6 controls the system of the digital copying apparatus MF1 and an image forming process. The engine ASIC 4 includes a CPU 5 that is a process controller which controls image reading by the scanner 3 and image writing by the plotter 2.

The main controller 6 includes a main CPU 7; a controller ASIC 8; an HDD (local memory) 9 for storing software (programs); a large amount of image data; job history and so on; and a RAM 10 for storing image data and status information of each element in the digital copying apparatus MF1.

The I/O controller 11 is an I/O ASIC and is connected to the main controller 6 via a general-purpose bus such as a PCI bus. The I/O controller 11 includes a sub CPU 12, a network circuit 13 ((MAC (media access control) circuit), a USB I/F 14, an SD I/F 15, an operating panel I/F 16, and circuits 21 through 23 (described below). The sub CPU 12 operates as the main CPU 7 in the power saving mode and controls communications via a network. The circuits 21 through 23 control returning to the normal mode from the power saving mode. A controlling section including the main controller 6 and the I/O controller 11 control all systems in the digital copying apparatus MF1. The main CPU 7 in the main controller 6 can easily access the RAM 10 and a register (not shown) in the I/O controller 11.

An SD card 18 is a detachable recording medium and can store optional font data, an optional application program, a system update program, and user document information. The SD card 18 is attached to the SD I/F 15. A communication cable of a digital camera (not shown), another scanner (not shown), a PC (not shown), or a host computer 17 is detachably connected to the USB I/F 14 in the I/O controller 11. The sub power supply circuit 20 is connected to the main controller 6.

In the above, the SD card 18 and the SD I/F 15 are examples, and another detachable recording medium can be used as the SD card 18 and another detachable recording medium I/F can be used as the SD I/F 15. In addition, the USB I/F 14 can make the host computer 17 wait to communicate with the digital copying apparatus MF1.

In the normal mode (operational mode), the digital copying apparatus MF1 can respond to access from an external device and can start a process directed by a user, for example, a document reading process, an image copying process, a document printing process, and so on while an operational voltage is applied to all elements in the digital copying apparatus MF1.

In the power saving mode (low power consumption mode), power is supplied to only circuits which recognize access from an external device and from a user instruction to the digital copying apparatus MF1, for example, a printing instruction, and maintain data storing in a memory, and power is not supplied to other circuits.

Figure 5:
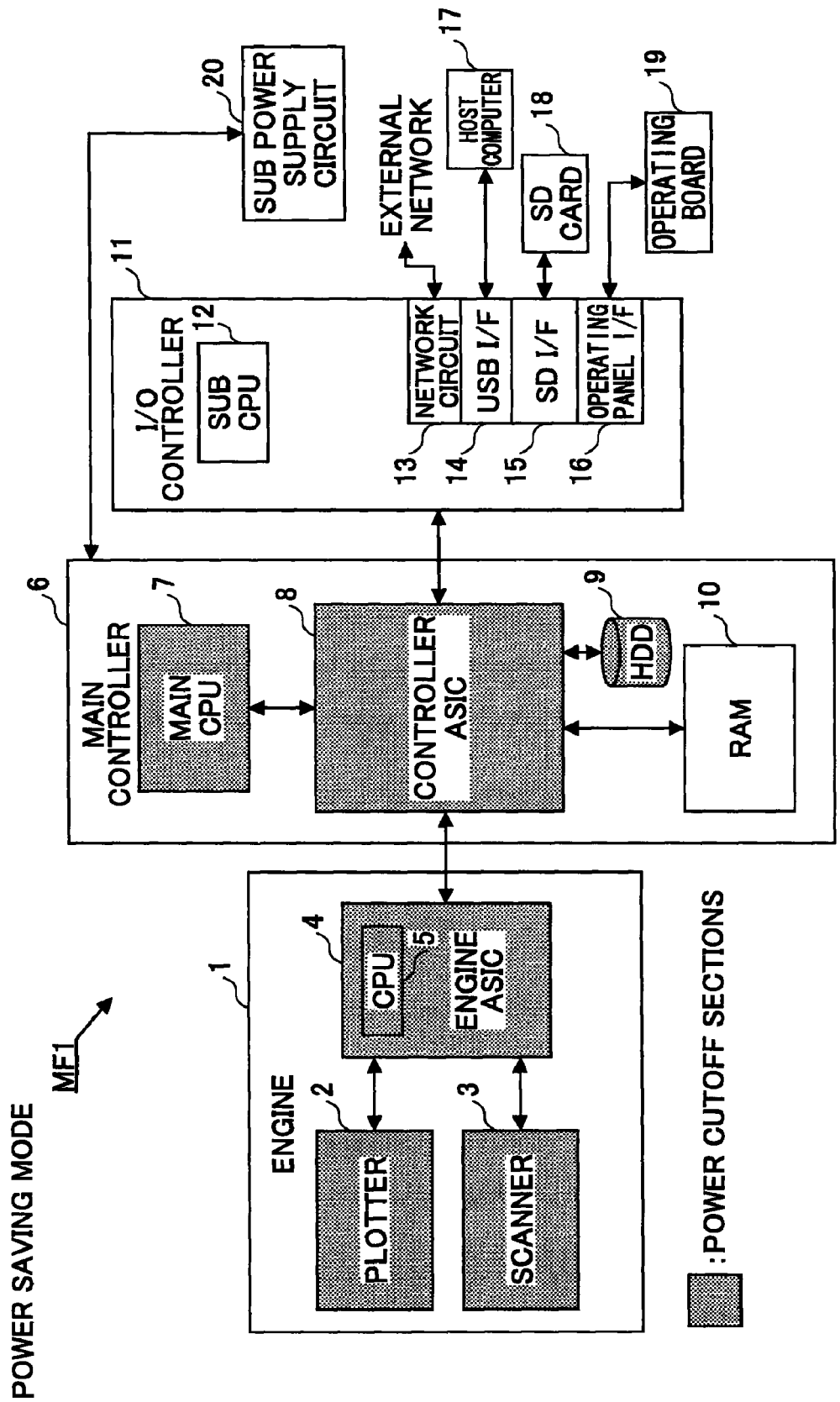
FIG. 5 is a block diagram showing the image forming apparatus shown in FIG. 1 in the power saving mode.

In FIG. 1, since the digital copying apparatus MF1 is in the normal mode, power has been supplied to the engine 1, the main controller 6, the I/O controller 11, and the sub power supply circuit 20. In the power saving mode, the power is cut off to the engine 1, the main CPU 7, and a part of the controller ASIC 8 in the main controller 6. FIG. 5 is a block diagram showing the digital copying apparatus MF1 in the power saving mode. In FIG. 5, power cutoff sections are shown by gray areas.

Figure 2:
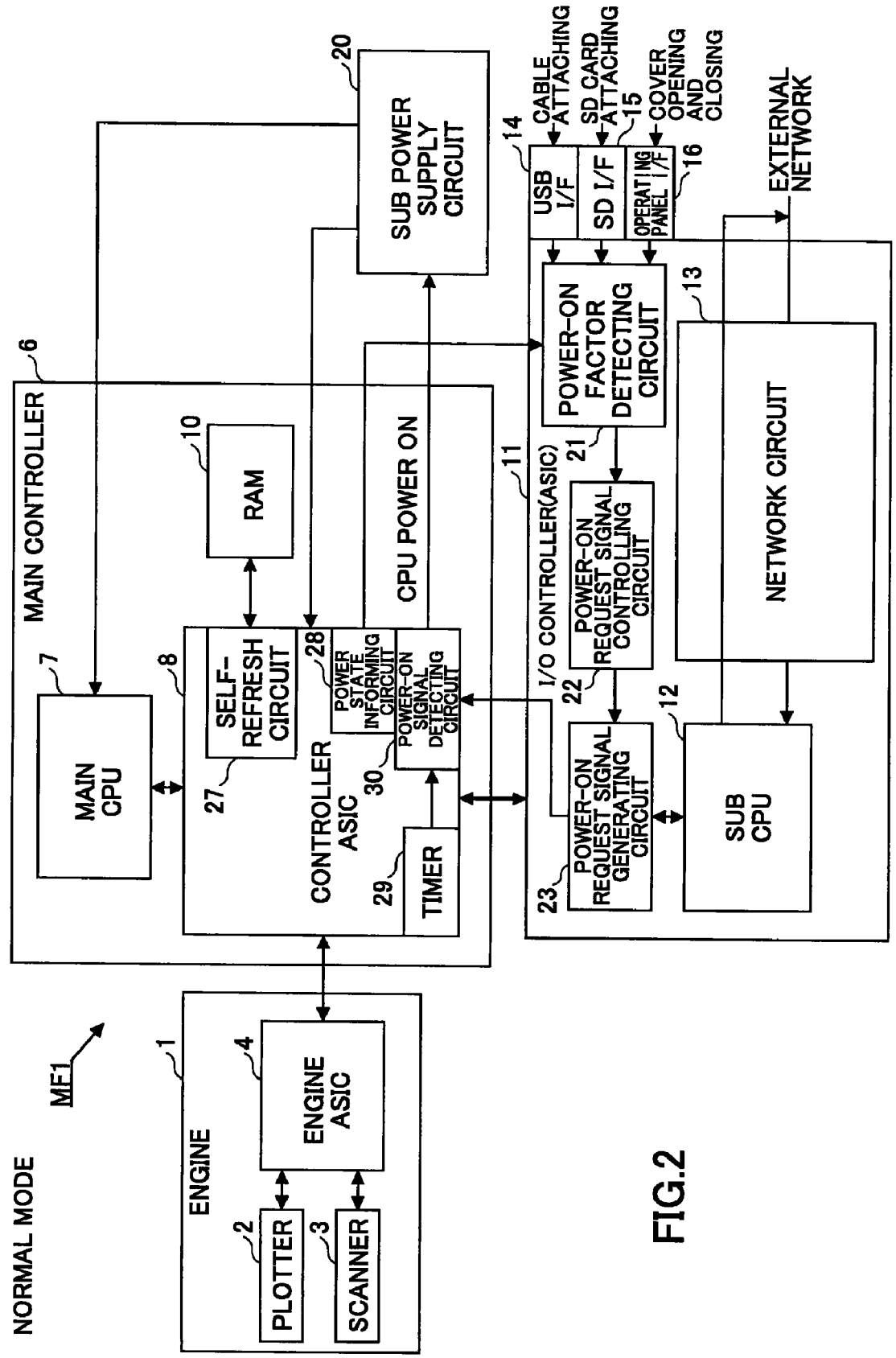
FIG. 2 is a block diagram showing main sections for executing switching operations between a normal mode and a power saving mode in the image forming apparatus.
Figure 6:
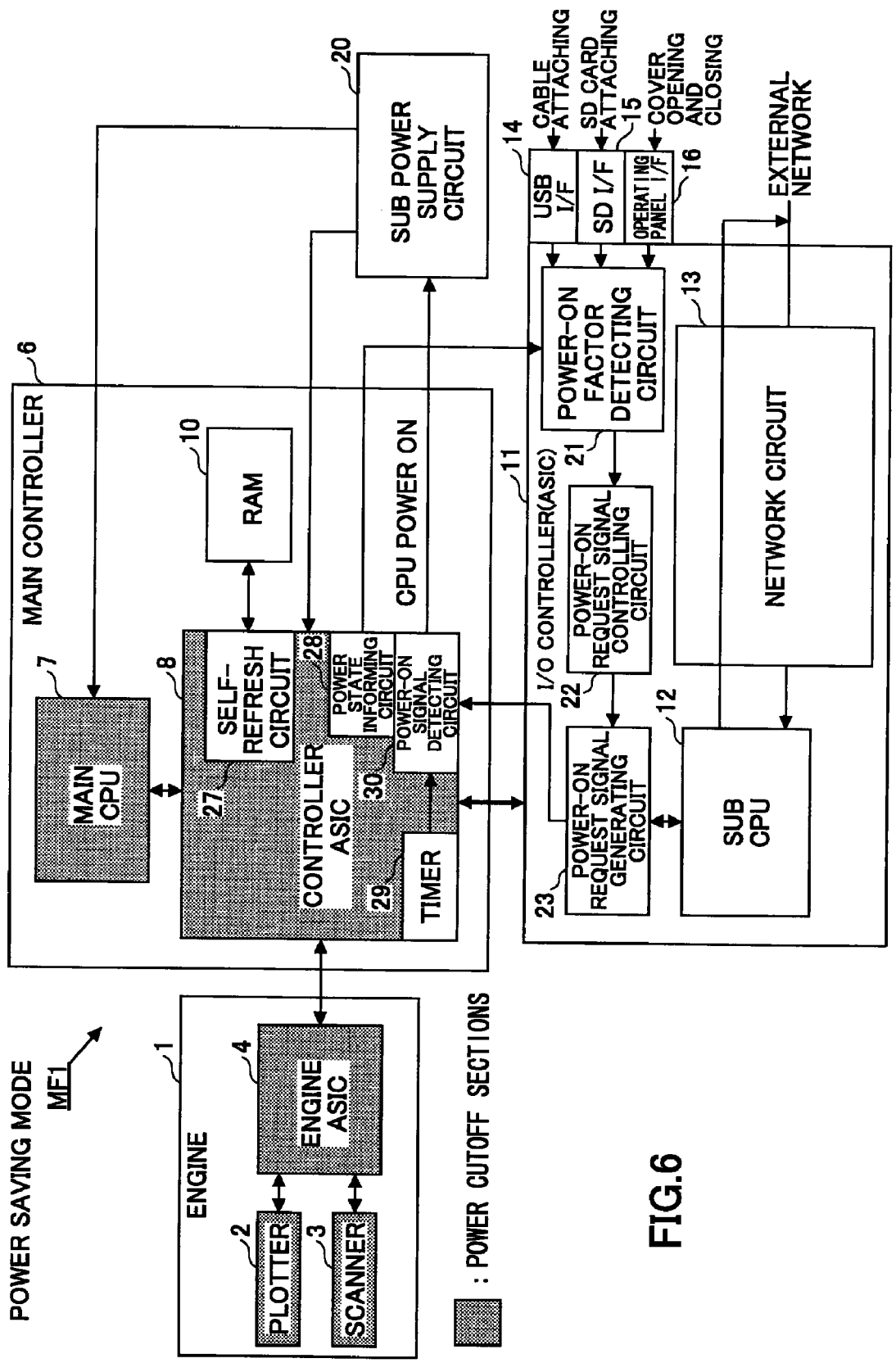
FIG. 6 is a block diagram showing the main sections shown in FIG. 2 in the power saving mode.

FIG. 2 is a block diagram showing main sections for executing switching operations between the normal mode and the power saving mode in the digital copying apparatus MF1. FIG. 6 is a block diagram showing the main sections shown in FIG. 2 in the power saving mode. In FIG. 2, the normal mode is shown, and in FIG. 6, power cutoff sections are shown by gray areas.

As shown in FIG. 2, the controller ASIC 8 includes a self-refresh circuit 27, a power state informing circuit 28, a timer 29, and a power-on signal detecting circuit 30. The I/O controller 11 includes a power-on factor detecting circuit 21, a power-on request signal controlling circuit 22, and a power-on request signal generating circuit 23. In addition, in FIG. 2, the sub power supply circuit 20 is connected to the main controller 6 and the controller ASIC 8.

In the normal mode, when the main CPU 7 enters a standby mode in which the digital copying apparatus MF1 can immediately start a process in response to an image processing instruction by a user operation on the digital copying apparatus MF1 or by external access thereto, the main CPU 7 starts the timer 29. The user operation includes document reading, image writing, document copying, stored image transferring, copying a received facsimile, and so on. The external access includes communications from an external device, for example, a document printing instruction. When the timer 29 counts up a predetermined time, the main CPU 7 switches the sub power supply circuit 20 from the normal mode to the power saving mode.

That is, in response to the count-up of the timer 29, the main CPU 7 informs the I/O controller 11 of switching to the power saving mode via the power state informing circuit 28 in the controller ASIC 8. With this, as shown in FIG. 6, the power is cut off to the scanner 3, the plotter 2, the engine ASIC 4 in the engine 1, and the main CPU 7 and a part of the controller ASIC 8. As described above, in FIG. 6, power cutoff sections are shown by gray areas.

When the I/O controller 11 receives the information of switching to the power saving mode, the I/O controller 11 switches the power-on factor detecting circuit 21, the power-on request signal controlling circuit 22, and the power-on request signal generating circuit 23 to the status corresponding to the power saving mode, and the sub CPU 12 is released from the sleep (idle) mode. That is, the sub CPU 12 enters the status in which the sub CPU 12 can partially operate as the main CPU 7. That is, an operating voltage is supplied to the sub CPU 12. With this, the sub CPU 12 starts to operate a part of control of the main CPU 7. After this, when the sub power supply circuit 20 is switched from the normal mode to the power saving mode, power to the main CPU 7 is cut off and the main CPU 7 stops operations.

In the power saving mode shown in FIG. 6, when an external device accesses the network circuit 13 via an external network, the sub CPU 12 communicates with the external device and makes the power-on request signal generating circuit 23 generate a power-on (instruction) signal. Then, the power-on request signal generating circuit 23 sends the power-on signal to the power-on signal detecting circuit 30 in the controller ASIC 8. The power-on signal detecting circuit 30 instructs the sub power supplying circuit 20 to switch to the normal mode from the power saving mode. With this, the sub power supply circuit 20 switches the power output from the power saving mode to the normal mode. When an operating voltage of the normal mode is applied to the controller ASIC 8, the power state informing circuit 28 sends a normal mode signal to the I/O controller 11 signifying that the mode is switched to the normal mode. With this, the power-on factor detecting circuit 21, the power-on request signal controlling circuit 22, and the power-on request signal generating circuit 23 are switched to the status corresponding to the normal mode. The sub CPU 12 switches communication control with the external device via the network circuit 13 to the main CPU 7 and enters the sleep (idle) mode.

In the power saving mode shown in FIG. 6, when an SD card 18 is attached to or detached from the SD I/F 15, or a communication cable of a host computer 17 is attached to or detached from the USB I/F 14, an attaching change detecting circuit 31 or 36 (described below in FIG. 3) of the power-on factor detecting circuit 21 generates a change detection signal, and in response to the change detection signal, an interrupt circuit 35 or 40 (described below in FIG. 3) sends an interrupt request signal (of low level L in the present embodiment) to the sub CPU 12, the power-on request signal controlling circuit 22, and the main CPU 7.

In response to the interrupt request signal, the sub CPU 12 stores changing source information that the change detection signal is from the SD I/F 15 or the USB I/F 14 in the register (not shown) in the I/O controller 11. The power-on request signal controlling circuit 22 sends a switching request signal from the power saving mode to the normal mode to the power-on signal detecting circuit 30 of the controller ASIC 8 via the power-on request signal generating circuit 23.

In response to the switching request signal, the sub power supply circuit 20 switches the power output from the power saving mode to the normal mode. When an operating voltage of the normal mode is applied to the controller ASIC 8 by the above switching, the power state informing circuit 28 sends a normal mode signal signifying the normal mode to the I/O controller 11, and the power-on factor detecting circuit 21, the power-on request signal controlling circuit 22, and the power-on request signal generating circuit 23 become the status corresponding to the normal mode. With this, the sub CPU 12 enters the sleep mode.

Since the mode is switched to the normal mode, the main CPU 7 starts operations; however, the interrupt request signal of the main CPU 7 has the level L; therefore, an interrupt process is started (described below in FIG. 8).

When a cover of the digital copying apparatus MF1 is opened, an interlock switch cuts off power to the engine 1; and the power-on factor detecting circuit 21, the power-on request signal controlling circuit 22, and the power-on request signal generating circuit 23 in the I/O controller 11 and the power-on signal detecting circuit 30 in the controller ASIC 8 instruct the sub power supply circuit 20 to stop the power supply to the engine 1. When the cover of the digital copying apparatus MF1 is closed, the circuits 21 thorough 23 and the power-on signal detecting circuit 30 instruct the sub power supply circuit 30 to switch to the normal mode from the power saving mode, and when a user inputs an operation on the operating board 19 in the power saving mode, the circuits 21 through 23 and the power-on signal detecting circuit 30 instruct the sub power supply circuit 20 to switch to the normal mode.

As shown in FIG. 6, in the power saving mode, the power to the gray sections is cut off and the gray sections are not in operation. However, the power has been supplied to the RAM 10 in which software for the main CPU 7, variables for jobs, and so on are stored and maintained. In the RAM 10, information whether an SD card 18 has been attached to or detached from the SD I/F 15, information of the attached SD card 18, information whether a communication cable of a host computer 17 has been attached to or detached from the USB I/F 14 which can make the host computer 17 wait to operate, and information of the host computer 17 whose communication cable is attached to the USB I/F 14 are stored. The sub CPU 12 cannot access the above information. The above information is not limited to be stored in the RAM 10, and can be stored in a flip-flop circuit, a latching device, a flash memory, or a ROM.

When the mode is returned from the power saving mode to the normal mode, the main CPU 7 returns the status of each element in the digital copying apparatus MF1 to the status before switching to the power saving mode based on the information in the RAM 10. At this time, when an interrupt signal corresponding to an attaching change of the SD card 18 (detachable recording medium) to the SD I/F 15 or an interrupt signal corresponding to an attaching change of the communication cable of the host computer 17 to the USB I/F 14 is given from the sub CPU 12, the main CPU 7 renews the status after the change by determining the changed status while referring to the information in the RAM 10. That is, the main CPU 7 renews the status of the SD I/F 15 or the USB I/F 14 based on the changed status.

In communications with another host computer, for example, a PC via the network circuit 13 (MAC circuit) which cannot make the host computer wait to operate, a device driver in software on the sub CPU 12 executes the communications even in the power saving mode.

Figure 3:
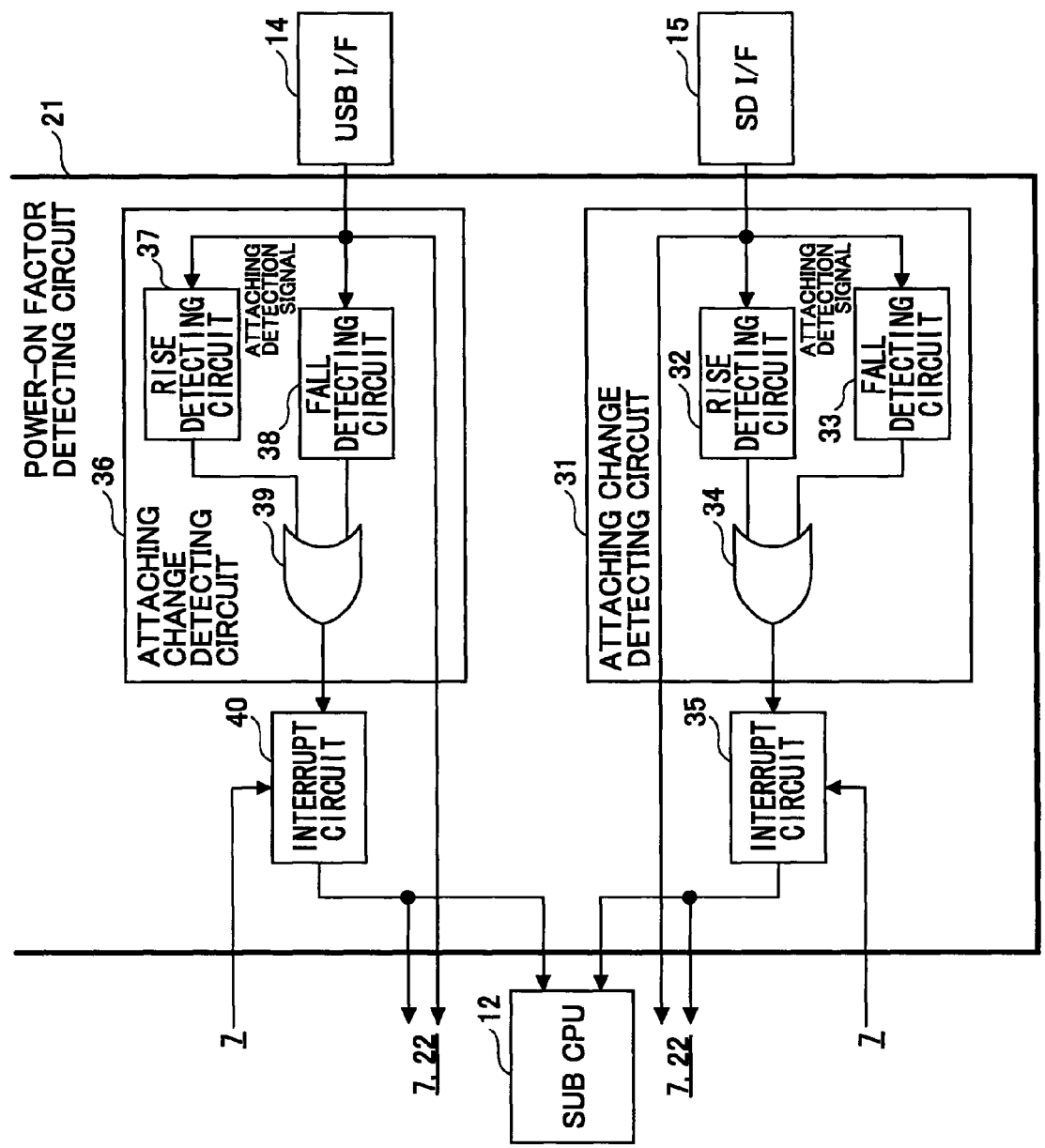
FIG. 3 is a block diagram showing a power-on factor detecting circuit of an I/O controller in the image forming apparatus.

FIG. 3 is a block diagram showing the power-on factor detecting circuit 21 in the I/O controller 11. As shown in FIG. 3, the power-on factor detecting circuit 21 includes the attaching change detecting circuit 31 which detects an attaching change of an SD card 18 to the SD I/F 15, the attaching change detecting circuit 36 which detects an attaching change of a communication cable of a host computer 17 to the USB I/F 14, and the interrupt circuits 35 and 40. The SD I/F 15 sends an attaching detection signal showing whether an SD card 18 is attached to the SD I/F 15 to the attaching change detecting circuit 31. In the attaching detection signal, when the SD card 18 is attached to the SD I/F 15, a high level signal H is given, and when the SD card 18 is not attached to the SD I/F 15, a low level signal L is given. In the attaching change detecting circuit 31, a rise detecting circuit 32 generates a rise detection pulse H having a predetermined width when the attaching detection signal rises to a level H from a level L, and a fall detecting circuit 33 generates a fall detection pulse H having a predetermined width when the attaching detection signal falls to the level L from the level H. These detection signals are sent to the interrupt circuit 35 (latching circuit) via an OR gate 34. The interrupt circuit 35 is set by the detection signal and generates an interrupt request signal and sends the interrupt request signal to the sub CPU 12, the main CPU 7, and the power-on request signal controlling circuit 22.

Similar to the above, the USB I/F 14 sends an attaching detection signal showing whether a communication cable of a host computer 17 is attached to the USB I/F 14 to the attaching change detecting circuit 36. In the attaching detection signal, when the communication cable is attached to the USB I/F 14, a high level signal H is given, and when the communication cable is not attached to the USB I/F 14, a low level signal L is given. In the attaching change detecting circuit 36, a rise detecting circuit 37 generates a rise detection pulse H having a predetermined width when the attaching detection signal rises to a level H from a level L, and a fall detecting circuit 38 generates a fall detection pulse H having a predetermined width when the attaching detection signal falls to the level L from the level H. These detecting signals are sent to the interrupt circuit 40 (latching circuit) via an OR gate 39. The interrupt circuit 40 is set by the detection signal and generates an interrupt request signal and sends the interrupt request signal to the sub CPU 12, the main CPU 7, and the power-on request signal controlling circuit 22.

In the power saving mode, the sub CPU 12 stores information showing the attaching change status of the SD card 18 or the communication cable of the host computer 17 in the register of the I/O controller 11 by an interrupt process corresponding to the interrupt request signal. The power-on request signal controlling circuit 22 gives a switching instruction signal which instructs to switch to the normal mode to the power-on signal detecting circuit 30 in the controller ASIC 8 via the power-on request signal generating circuit 23 in response to the interrupt request signal. The power-on signal detecting circuit 30 sends the switching instruction signal to the sub power supply circuit 20. With this, the sub power supply circuit 20 is switched to the normal mode from the power saving mode.

In the normal mode, since the sub CPU 12 is in the sleep mode, the sub CPU 12 does not respond to the interrupt request signal. In addition, since the sub power supply circuit 20 is in the normal mode, the power-on request signal controlling circuit 22 does not respond to the interrupt request signal.

In the power saving mode, when the interrupt request signal is generated, since the operating voltage to the main CPU 7 is cut off, the main CPU 7 does not respond to the interrupt request signal. However, the main CPU 7 starts operations soon after the operating voltage is applied to the main CPU 7 when the sub power supply circuit 20 is switched from the power saving mode to the normal mode. That is, the main CPU 7 starts an interrupt process in response to the interrupt request signal, refers to the information (for example, the SD I/F 15 information) in the register of the I/O controller 11 stored by the sub CPU 12, refers to mounting status information (of the SD I/F 15) in the RAM 10, and renews the information in the RAM 10. Then, the interrupt circuit 35 or 40 is reset. That is, the interrupt signal is changed to the level H which shows the interrupt request does not exist.

In the normal mode, when the interrupt circuit 35 (40) generates an interrupt request signal, the main CPU 7 starts the interrupt process in response to the interrupt request signal, reads an attaching detection signal of the SD I/F 15, and renews the status information in the RAM 10. Since the sub CPU 12 is in the sleep mode, the sub CPU 12 does not respond to the interrupt request signal. In addition, since the sub power supply circuit 20 is in the normal mode, the power-on request signal controlling circuit 22 does not respond to the interrupt request signal.

Figure 4A:
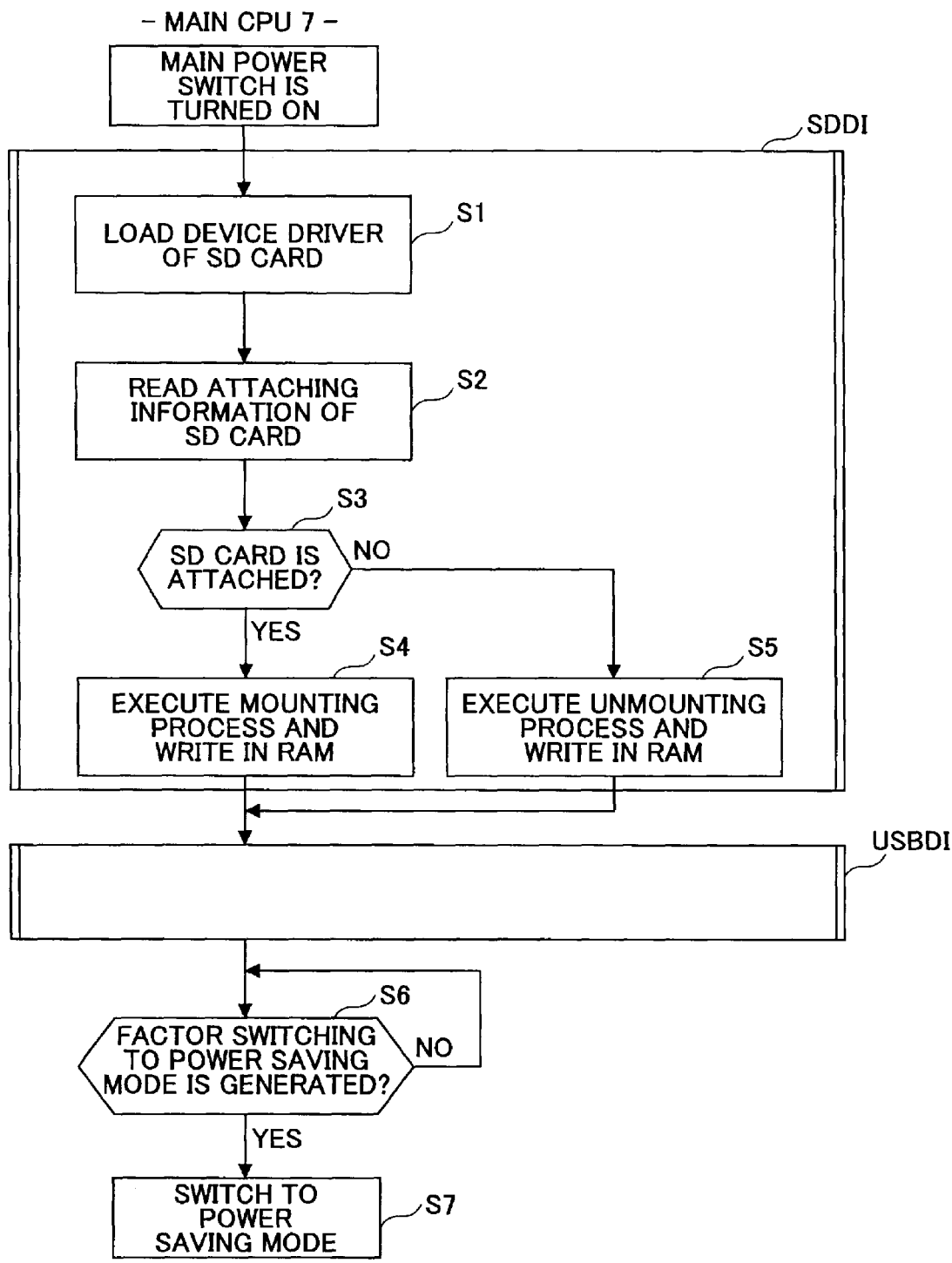
FIG. 4A is a flowchart showing default setting processes of a detachable recording medium to an SD I/F and a USB device to a USB I/F.
Figure 4B:
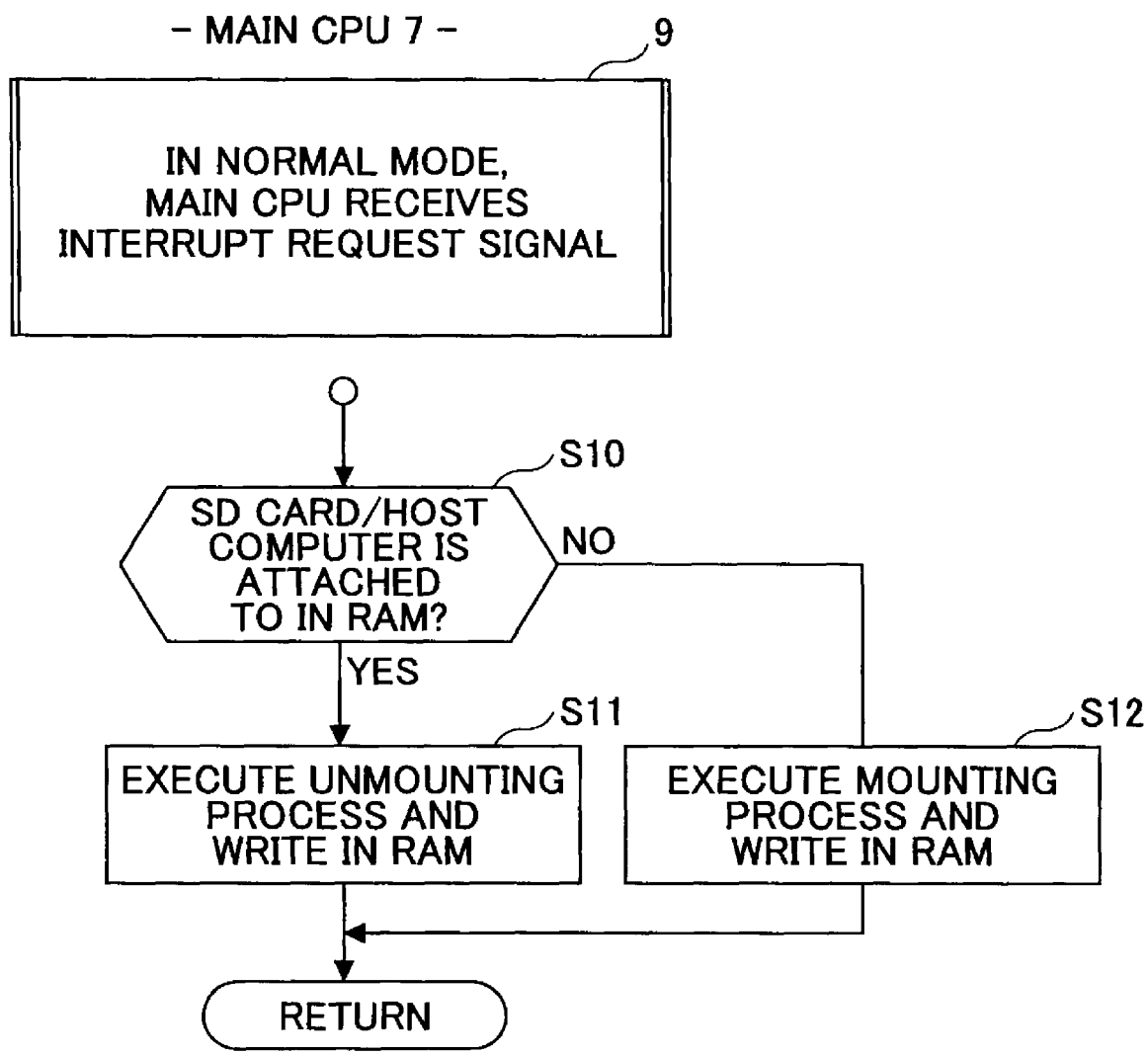
FIG. 4B is a flowchart showing interrupt processes corresponding to attaching/detaching the detachable recording medium to/from the SD I/F and attaching/detaching the USB device to/from the USB I/F.

FIG. 4A is a flowchart showing default setting processes of a detachable recording medium (the SD card 18) to the SD I/F 15 and a USB device (the host computer 17) to the USB I/F 14. FIG. 4B is a flowchart showing interrupt processes corresponding to attaching the SD card 18 to the SD I/F 15 and attaching the communication cable of the host computer 17 to the USB I/F 14.

In FIG. 4A, when the plug of the digital copying apparatus MF1 is put in an outlet and the main power switch of the digital copying apparatus MF1 is turned on, the sub power supply circuit 20 enters the normal mode. Soon after the main power switch is turned on, default settings in the SD I/F 15 and the USB I/F 14 are executed. In FIG. 4B, interrupt processes which are executed by attaching change detection of the SD card 18 to the SD I/F 15 or attaching change detection of the communication cable of the host computer 17 to the USB I/F 14 are shown in the main CPU 7.

After turning on the main power switch and executing a default process in the main CPU 7, the main CPU 7 stores attaching detection information of the SD card 18 to the SD I/F 15 and the communication cable of the host computer 17 to the USB I/F 14 in the RAM 10.

First, the default setting processes shown in FIG. 4A are described. As described above, after turning on the main power switch of the digital copying apparatus MF1, the sub power supply circuit 20 enters the normal mode. First, the default setting of a detachable recording medium (the SD card 18) is described. The default setting is called SDDI.

In FIG. 4A, first, the main CPU 7 loads a device driver for the SD card 18 (detachable recording medium) to be attached to the SD I/F 15 to an operating program of the main CPU 7

(S1). Next, the main CPU 7 reads the attaching information of the SD card 18 to the SD I/F 15 from the SD I/F 15 (S2), and determines whether the SD card 18 is attached to the SD I/F 15 (S3). When the SD card 18 is attached to the SD I/F 15 (YES in S3), the main CPU 7 executes a mounting process for the SD I/F 15 and writes the attaching information of the SD card 18 to the SD I/F 15 in the RAM 10 (S4). When the SD card 18 is not attached to the SD I/F 15 (NO in S3), the main CPU 7 executes an unmounting process for the SD I/F 15 and writes the unattaching information of the SD card 18 to the SD I/F 15 in the RAM 10 (S5).

Similar to the above processes, the main CPU 7 executes a USB device default setting whether a communication cable of a host computer 17 (USB device) is attached to the USB I/F 14. The USB device default setting is called USBDI.

In the normal mode, when a switching factor from the normal mode to the power saving mode is generated (after a predetermined time is counted by the timer 29) (S6), the main CPU 7 is switched to the power saving mode (S7). That is, the main CPU 7 informs the I/O controller 11 of switching to the power saving mode via the power state informing circuit 28 in the controller ASIC 8 and instructs the sub power supply circuit 20 to switch to the power saving mode. In response to the instruction, the sub power supply circuit 20 is switched from the normal mode to the power saving mode. The I/O controller 11 makes the sub CPU 12 return to the operating status (wake up status).

Next, interrupt processes shown in FIG. 4B are described. In the normal mode, the main CPU 7 reads the attaching detection signal output from the SD I/F 15 or the USB I/F 14 in response to an interrupt request signal output from the interrupt circuit 35 or 40 (S9). Then it is determined in the RAM 10 whether the SD card 18 is attached to the SD I/F 15 (the communication cable of the host computer 17 is attached to the USB I/F 14) (S10). When the SD card 18 is attached to the SD I/F 15 or the communication cable of the host computer 17 is attached to the USB I/F 14 as determined in the RAM 10 (YES in S10), the main CPU 7 determines that the SD card 18 is detached from the SD I/F 15 (the communication cable of the host computer 17 is detached from the USB I/F 14) and executes an unmounting process for the SD I/F 15 (the USB I/F 14) and writes the detaching information of the SD card 18 to the SD I/F 15 (the communication cable of the host computer 17 to the USB I/F 14) in the RAM 10 (S11). When the SD card 18 is not attached to the SD I/F 15 (the communication cable of the host computer 17 is not attached to the USB I/F 14) (NO in S10), the main CPU 7 determines that the SD card 18 is attached to the SD I/F 15 (the communication cable of the host computer 17 is attached to the USB I/F 14) and executes a mounting process for the SD I/F 15 (the USB I/F 14) and writes the attaching information of the SD card 18 to the SD I/F 15 (the communication cable of the host computer 17 to the USB I/F 14) in the RAM 10 (S12).

FIG. 7 is a flowchart showing switching processes from the normal mode to the power saving mode and returning processes from the power saving mode to the normal mode in the main CPU 7 and the I/O controller 11.

Referring to FIG. 7, first, the switching processes from the normal mode to the power saving mode are described. When the main CPU 7 informs the I/O controller 11 of switching from the normal mode to the power saving mode via the power state informing circuit 28 in the controller ASIC 8 (S7a), the power-on factor detecting circuit 21, the power-on request signal controlling circuit 22, and the power-on request signal generating circuit 23 in the I/O controller 11 are switched to the status corresponding to the power saving mode, and the sub CPU 12 is released from the sleep mode (S31). That is, an operating voltage is applied to the sub CPU 12. By the release of the sub CPU 12 from the sleep mode, the sub CPU 12 enables an interrupt process by an interrupt request signal from the interrupt circuit 35 or 40 (S32). When the interrupt request signal is input (YES in S33), the sub CPU 12 determines whether the interrupt request signal is sent from the SD I/F 15 or the USB I/F 14 (S34). When the interrupt request signal is sent from the SD I/F 15 or the USB I/F 14 (YES in S34), the sub CPU 12 stores information of the SD card 18 connected to the SD I/F 15 or the host computer 17 connected to the USB I/F 14 which sends the interrupt request signal in the register of the I/O controller 11 (S35). When the interrupt request signal is not sent from the SD I/F 15 or the USB I/F 14 (NO in S34), it is determined whether the interrupt request signal is an event which returns the main CPU 7 to the normal mode (S40). When the interrupt request signal is an event which returns the main CPU 7 to the normal mode (YES in S40), the sub CPU 12 stores the event which returns the main CPU 7 to the normal mode in the register of the I/O controller 11 (S41).

The power-on request signal controlling circuit 22 instructs the sub power supply circuit 20 to switch to the normal mode from the power saving mode via the power-on request signal generating circuit 23 and the power-on signal detecting circuit 30, in response to the interrupt request signal from the interrupt circuit 35 or 40, or another interrupt request (returning factor to the normal mode). Since the switching instruction to the normal mode is executed in the power saving mode (the power to the main CPU 7 is turned off), when the power to the main CPU is turned on (the normal mode), after switching to the power saving mode (the power to the main CPU 7 is turned off), the power-on request signal controlling circuit 22 instructs the sub power supply circuit 20 to switch to the normal mode. That is, it is determined whether the power of the main CPU 7 is turned off (S36). When the power of the main CPU 7 is turned off (YES in S36), the sub power supply circuit 20 is instructed to switch to the normal mode (S37). Then an interrupt request signal from the interrupt circuit 35 or 40, or another interrupt request signal such as an event is sent to the main CPU 7 (S38).

Then the sub power supply circuit 20 is switched to the normal mode in response to the instruction which switches to the normal mode. With this, the operating voltage of the normal mode is applied to the controller ASIC 8, and the power state informing circuit 28 sends a normal mode signal signifying that the mode is switched to the normal mode to the I/O controller 11. Then the power-on factor detecting circuit 21, the power-on request signal controlling circuit 22, and the power-on request signal generating circuit 23 are switched to the status corresponding to the normal mode. The sub CPU 12 switches control to the main CPU 7 in response to the normal mode signal and enters the sleep mode (S39).

As described above, when a factor for returning to the normal mode from the power saving mode is generated, under the condition that the power of the main CPU 7 is turned off (the power saving mode), the instruction for switching to the normal mode is given to the sub power supply circuit 20. That is, since it takes a long time from informing the I/O controller 11 of switching to the power saving mode to turning off the power of the main CPU 7 by the switching operations, when a factor for returning to the normal mode is detected during the long time, the mode is returned to the normal mode after turning off the power to the main CPU 7. With this, even if an event (returning factor to the normal mode) is generated in the middle of switching to the power saving mode, a detection loss of the event can be avoided, and instructions switching to the power saving mode from the normal mode and switching to the normal mode from the power saving mode cannot collide. With this, simple switching control to the power saving mode can be realized.

In FIG. 7, after informing the I/O controller 11 of switching to the power saving mode (S7a), the main CPU 7 instructs the sub power supply circuit 20 to switch to the power saving mode (S7b), and the sub power supply circuit 20 is switched to the power saving mode (S7c). In addition, when the sub power supply circuit 20 is instructed to switch to the normal mode (S37), in the main CPU 7, the power of the main CPU 7 is turned on and the mode is returned to the normal mode (S8), and as described above, the process goes to the interrupt processes (S9).

In addition, in FIG. 7, in a network, the events which return the main CPU 7 to the normal mode are a printing request, a scanning request, an inquiry about engine information, and so on; and the events which do not return the main CPU 7 to the normal mode are packet communications in Ping, ARP, and so on in which a response is easy.

FIG. 8 is a flowchart showing the interrupt processes shown in S9 of FIG. 4B in detail after the main CPU 7 is returned to the normal mode from the power saving mode. Referring to FIG. 8, the interrupt processes are described in detail.

Soon after the main CPU 7 is returned to the normal mode from the power saving mode (S8), since an interrupt request signal is given to the main CPU 7, the main CPU 7 starts an interrupt process, that is, the main CPU 7 detects the interrupt request signal from the I/O controller 11 (10a). Next, the main CPU 7 refers to interrupt factor information stored in the register of the I/O controller 11 (S10b). The interrupt factor information includes information from the interrupt circuit 35 or 40 caused by attaching change in the SD I/F 15 or in the USB I/F 14, and information detected by the power-on factor detecting circuit 21.

When the interrupt factor information is from an attaching change of the SD card 18 to the SD I/F 15 (YES in S10c), the main CPU 7 refers to information for the SD I/F 15 in the RAM 10 and determines whether the SD card 18 is attached to the SD I/F 15 in the information on the RAM 10 (S10d). When the SD card 18 is attached to the SD I/F 15 in the information on the RAM 10 (YES in S10d), the main CPU 7 determines that the SD card 18 is detached from the SD I/F 15 (S11a). Then the main CPU 7 executes an unmounting process (stores the detached state of the SD card 18 from the SD I/F 15 in the RAM 10) (S11b). When the SD card 18 is not attached to the SD I/F 15 in the information on the RAM 10 (NO in S10d), the main CPU 7 determines that the SD card 18 is attached to the SD I/F 15 (S12a). Then the main CPU 7 executes a mounting process (stores the attached state of the SD card 18 to the SD I/F 15 in the RAM 10) (S12b). When the interrupt processes end, the main CPU 7 resets the interrupt circuit 35 and returns to a main routine.

When the interrupt factor information is not from an attaching change of the SD card 18 to the SD I/F 15 (NO in S10c), the main CPU 7 determines whether the interrupt factor information is from an attaching change of the communication cable of the host computer 17 to the USB I/F 14, (S10e). When the interrupt factor information is from an attaching change of the communication cable of the host computer 17 to the USB I/F 14 (YES in S10e), the main CPU 7 refers to information for the USB I/F 14 in the RAM 10 and determines whether the communication cable of the host computer 17 is attached to the USB I/F 14 in the information on the RAM 10 (S10f). When the communication cable of the host computer 17 is attached to the USB I/F 14 in the information on the RAM 10 (YES in S10f), the main CPU 7 determines that the communication cable of the host computer 17 is detached from the USB I/F 14 (S11c). Then the main CPU 7 executes an unmounting process (stores the detached state of the communication cable of the host computer 17 to the USB I/F 14 in the RAM 10 (S11d). When the communication cable of the host computer 17 is not attached to the USB I/F 14 in the information on the RAM 10 (NO in S10f), the main CPU 7 determines that the communication cable of the host computer 17 is attached to the USB I/F 14 (S12c). Then the main CPU 7 executes a mounting process (stores the attached state of the communication cable of the host computer 17 to the USB I/F 14 in the RAM 10) (S12d). When the interrupt processes end, the main CPU 7 resets the interrupt circuit 40 and returns to a main routine.

When the interrupt factor information is not from an attaching change of the communication cable of the host computer 17 to the USB I/F 14 (NO in S10e), the main computer 7 executes an interrupt process corresponding to event interrupt factor information (S13), and returns to a main routine.

In the following cases, in order to make the description concise, since operations in an attaching change of the SD card 18 to the SD I/F 15 are almost the same as those in an attaching change of the communication cable of the host computer 17 to the USB I/F 14, main operations of the main CPU 7 and the sub CPU 12 corresponding to the attaching change of the SD card 18 (detachable recording medium) to the SD I/F 15 are only described.

[A Case]

First, an A case is described. In the A case, after switching to the power saving mode in the SD card 18 detaching status, the SD card 18 is attached to the SD I/F 15.

Since the SD card 18 has not been attached to the SD I/F 15 in the normal mode, a device driver for the SD card 18 has not been loaded on software in the main CPU 7. In addition, the unmounting status (detaching status) of the SD card 18 from the SD I/F 15 has been stored in the RAM 10. When a switching factor from the normal mode to the power saving mode is generated, the main CPU 7 switches the sub power supply circuit 20 to the power saving mode from the normal mode. In the present embodiment, the timer 29 is started when a user input operation on the operating board 19 and communication access from an external device stop, and when the timer 29 counts up a predetermined time, the switching factor is generated and the main CPU 7 switches the sub power supply circuit 20 to the power saving mode from the normal mode.

In the power saving mode, when the sub CPU 12 obtains a change detection signal which detects an attaching change of the SD 18 to the SD I/F 15, the sub CPU 12 releases cutoff of the power supply to the main CPU 7 and the controller ASIC 8. That is, the sub power supply circuit 20 is switched to the normal mode from the power saving mode. In the attaching change, it is not determined whether the SD card 18 is attached to or detached from the SD I/F 15. With this, the main CPU 7 is returned to the normal mode from the power saving mode. Since the main CPU 7 detects an interrupt signal from the sub CPU 12, the main CPU 7 detects that the SD card 18 is attached to the SD I/F 15, and executes a mounting process of the SD card 18 to the SD I/F 15. Since the sub CPU 12 executes only a returning process to the normal mode and an interrupt process to the main CPU 7 in response to the attaching change, returning to the normal mode can be executed at high speed.

[B Case]

Next, a B case is described. In the B case, after switching to the power saving mode in the SD card 18 attaching status, the SD card is detached from the SD I/F 15.

Since the SD card 18 has been attached to the SD I/F 15 in the normal mode, a device driver for controlling access the SD card 18 has been loaded on software in the main CPU 7. In addition, the mounting status (attaching status) of the SD card 18 to the SD I/F 15 has been stored in the RAM 10. When a switching factor from the normal mode to the power saving mode is generated, the main CPU 7 switches the sub power supply circuit 20 to the power saving mode from the normal mode.

In the power saving mode, when the sub CPU 12 obtains a change detection signal which detects an attaching change of the SD 18 to the SD I/F 15, the sub CPU 12 releases cutoff of the power supply to the main CPU 7 and the controller ASIC 8. That is, the sub power supply circuit 20 is switched to the normal mode from the power saving mode. With this, the main CPU 7 is returned to the normal mode from the power saving mode. Since the main CPU 7 detects an interrupt signal from the sub CPU 12, the main CPU 7 detects an attaching change of the SD card 18 to the SD I/F 15, recognizes that the SD card 18 is detached from the SD I/F 15 from attaching status information in the RAM 10, and renews the attaching status information of the SD card 18 in the RAM 10 (stores detached information). Then the main CPU 7 executes an unmounting process of the SD card 18 from the SD I/F 15, and prevents accessing the SD card 18. In this case, since the sub CPU 12 executes only a returning process to the normal mode and an interrupt instruction process to the main CPU 7 in response to the attaching change, returning to the normal mode can be executed at high speed.

[C Case]

Next, a C case is described. In the C case, after switching to the power saving mode in the SD card 18 attaching status, the SD card is changed to another SD card 18.

In the C case, a first attaching change detection signal is generated when the attached SD card 18 is detached from the SD I/F 15, and a second attaching change detection signal is generated when the other SD card 18 is attached to the SD I/F 15. The operations of the sub CPU 12 and the main CPU 7 in the first attaching change detection signal are the same as those in the B case. In addition, when the second attaching change detection signal is generated in the status that the main CPU 7 has been returned to the normal mode in the detaching status of the SD card 18 from the SD I/F 15, the operations of the sub CPU 12 and the main CPU 7 are the same as those in the A case.

However, in the middle of returning to the normal mode in response to the first attaching change detection signal, when the second attaching change detection signal is generated, since in the middle of returning to the normal mode, the main CPU 7 responds to the second attaching change detection signal and renews the attaching information to changed attaching information in the RAM 10, and since an unmounting process for the SD card 18 is being executed in the middle of returning to the normal mode, a mounting process for the other SD card 18 is executed again. With this, the main CPU 7 can recognize that the SD card 18 is changed to the other SD card 18 without a time loss, and can execute operations corresponding to the attaching change.

As described above, according to the embodiment of the present invention, since the I/O controller 11 only detects the attaching change of the SD card 18 to the SD I/F 15 and does not determine whether the SD card 18 is attached to the SD I/F 15 or detached from the SD I/F 15, the code amount of programs in the I/O controller 11 can be decreased. That is, the capacity of the memory in the I/O controller 11 can be reduced. With this, the digital copying apparatus MF1 can be operated at low power consumption. Therefore, the main controller 6 can execute the mounting and the unmounting processes of the SD card 18 to and from the SD I/F 15 at high speed.

In addition, the contents of the returning factor to the normal mode from the power saving mode (attaching the SD card 18 to the SD I/F 15, detaching the SD card 18 from the SD I/F 15, and the contents of the SD card 18) are not needed to be stored in the register of the I/O controller 11. Therefore, the structure of the digital copying apparatus MF1 can be simplified, and the capacity of the memory and the size of the circuits can be small.

Further, the present invention is not limited to the specifically disclosed embodiment, and variations and modifications may be made without departing from the scope of the present invention.

The present invention is based on Japanese Priority Patent Application No. 2006-126031, filed on Apr. 28, 2006, with the Japanese Patent Office, the entire contents of which are hereby incorporated herein by reference.

What is claimed is:

1. A power supplying mode switching controller, comprising:
   a main controller which controls an image forming apparatus;
   a sub power supply circuit which has a normal mode for supplying an operating voltage to the image forming apparatus including the main controller, and a power saving mode for cutting off the operating voltage to a part of the image forming apparatus including the main controller;
   an I/O controller which causes the sub power supply circuit to switch to the normal mode when a factor for returning to the normal mode is generated in the power saving mode of the sub power supply circuit; and
   a detachable recording medium interface to which a detachable recording medium is attached in the I/O controller, wherein
   the I/O controller includes a first attaching change detecting circuit which detects an attaching change of the detachable recording medium to the detachable recording medium interface; and
   when the first attaching change detecting circuit detects the attaching change of the detachable recording medium to the detachable recording medium interface in the power saving mode, the I/O controller switches the sub power supply circuit to the normal mode and informs the main controller of the attaching change of the detachable recording medium, and the main controller renews information in a memory to be attaching change information.

2. The power supplying mode switching controller as claimed in claim 1, further comprising:
   a communication device interface configured to make operations of a communication device, to which interface the communication device is attached in the I/O controller, wait, wherein
   the I/O controller includes a second attaching change detecting circuit which detects an attaching change of the communication device to the communication device interface; and
   when the second attaching change detecting circuit detects the attaching change of the communication device to the communication device interface in the power saving mode, the I/O controller causes the sub power supply circuit to switch to the normal mode and informs the main controller of the attaching change of the communication device, and the main controller renews information in the memory to be the attaching change information.

3. The power supplying mode switching controller as claimed in claim 1, further comprising:
an operating panel interface to which a user inputs user operations in the I/O controller, wherein
the I/O controller includes a power-on factor detecting circuit which detects the user operations of the image forming apparatus; and
when the power-on factor detecting circuit detects the user operations, the I/O controller causes the sub power supply circuit to switch to the normal mode.

4. The power supplying mode switching controller as claimed in claim 1, further comprising:
a network circuit to which an external network device transmits data in the I/O controller, wherein
the I/O controller includes a power-on factor detecting circuit which detects the data transmitted from the external network device to the image forming apparatus; and
when the power-on factor detecting circuit detects the data transmission from the external network device, the I/O controller causes the sub power supply circuit to switch to the normal mode.

5. The power supplying mode switching controller as claimed in claim 1, wherein:
the first attaching change detecting circuit sends the attaching change to the main controller, and the main controller renews the information in the memory to be the attaching change information in the normal mode.

6. The power supplying mode switching controller as claimed in claim 2, wherein:
the second attaching change detecting circuit sends the attaching change to the main controller, and the main controller renews the information in the memory to be the attaching change information in the normal mode.

7. The power supplying mode switching controller as claimed in claim 1, wherein:
the attaching change is reported as an interrupt signal, the I/O controller responds to the interrupt signal in the power saving mode, switches the power supply circuit to the normal mode, and informs the main controller of the attaching change.

8. The power supplying mode switching controller as claimed in claim 2, wherein:
the attaching change is reported as an interrupt signal, the I/O controller responds to the interrupt signal in the power saving mode, switches the sub power supply circuit to the normal mode, and informs the main controller of the attaching change.

9. The power supplying mode switching controller as claimed in claim 1, wherein:
a device driver for controlling the detachable recording medium interface by which interface data on the detachable recording medium are read is stored in an operating program of the main controller.

10. The power supplying mode switching controller as claimed in claim 1, wherein:
an operating program of the I/O controller includes a program which switches the sub power supply circuit to the normal mode in response to the attaching change of the detachable recording medium to the detachable recording medium interface and informs the main controller of the attaching change information.

11. The power supplying mode switching controller as claimed in claim 9, wherein:
the main controller receives the attaching change information and executes an unmounting process from the detachable recording medium when the detachable recording medium is detached from the detachable recording medium interface and executes a mounting process to the detachable recording medium when the detachable recording medium is attached to the detachable recording medium interface by using the device driver.

12. The power supplying mode switching controller as claimed in claim 1, wherein:
the detachable recording medium stores optional font data and/or an optional application program.

13. The power supplying mode switching controller as claimed in claim 1, wherein:
the detachable recording medium stores a system update program for using when the operating program of the main controller has a fault.

14. The power supplying mode switching controller as claimed in claim 2, wherein:
a device driver for controlling the communication device interface by which interface communications with the communication device are executed is stored in an operating program of the main controller.

15. The power supplying mode switching controller as claimed in claim 2, wherein:
an operating program of the I/O controller includes a program which switches the sub power supply circuit to the normal mode in response to the attaching change of the communication device to the communication device interface and informs the main controller of the attaching change information.

16. The power supplying mode switching controller as claimed in claim 14, wherein:
the main controller receives the attaching change information and executes an unmounting process for the communication device when the communication device is detached from the communication device interface and executes a mounting process for the communication device when the communication device is attached to the communication device interface by using the device driver.

17. The power supplying mode switching controller as claimed in claim 1, wherein:
when a switching factor to the power saving mode from the normal mode is generated, the main controller instructs the I/O controller to switch the sub power supply circuit to the power saving mode, and
when the attaching change of the detachable recording medium to the detachable recording medium interface is detected by the first attaching change detecting circuit, the I/O controller causes the sub power supply circuit to switch to the normal mode from the power saving mode under the condition that the sub power supply circuit is in the power saving mode.

18. The power supplying mode switching controller as claimed in claim 2, wherein:
when a switching factor to the power saving mode from the normal mode is generated, the main controller instructs the I/O controller to cause the sub power supply circuit to switch to the power saving mode, and
when the attaching change of the communication device to the communication device interface is detected by the second attaching change detecting circuit, the I/O controller causes the sub power supply circuit to switch to the normal mode from the power saving mode under the condition that the sub power supply circuit is in the power saving mode.

19. An image forming apparatus which forms an image on a recording medium by using a plotter and/or a scanner, comprising:

a main power source which supplies an operating voltage to all elements in the image forming apparatus;

a main controller which controls the image forming apparatus;

a sub power supply circuit which has a normal mode for supplying the operating voltage to all the elements of the image forming apparatus and a power saving mode for cutting off the operating voltage to a part of the image forming apparatus;

an I/O controller which causes the sub power supply circuit to switch to the normal mode when a factor for returning to the normal mode is generated in the power saving mode of the sub power supply circuit;

a detachable recording medium interface to which a detachable recording medium is attached in the I/O controller; and a communication device interface configured to make operations of a communication device, to which interface the communication device is attached in the I/O controller, wait, wherein the I/O controller includes a first attaching change detecting circuit which detects an attaching change of the detachable recording medium to the detachable recording medium interface;

when the first attaching change detecting circuit detects the attaching change of the detachable recording medium to the detachable recording medium interface in the power saving mode, the I/O controller causes the sub power supply circuit to switch to the normal mode and informs the main controller of the attaching change of the detachable recording medium, and the main controller renews information in a memory to be attaching change information;

the I/O controller includes a second attaching change detecting circuit which detects an attaching change of the communication device to the communication device interface; and when the second attaching change detecting circuit detects the attaching change of the communication device to the communication interface in the power saving mode, the I/O controller causes the sub power supply circuit to switch to the normal mode and informs the main controller of the attaching change of the communication device, and the main controller renews information in the memory to be attaching change information.

20. A power supplying mode switching method, comprising:

controlling, by a main controller, an image forming apparatus;

switching, by an I/O controller, a sub power supply circuit to a normal mode for supplying an operating voltage to the image forming apparatus including the main controller, when a factor for returning to the normal mode is generated while the sub power supply circuit is in a power saving mode for cutting off the operating voltage to a part of the image forming apparatus including the main controller;

detecting an attachment change of a detachable recording medium to the I/O controller; and when an attachment change is detected in the detecting step while the sub power supply circuit is in the power saving mode, switching, by the I/O controller, the sub power supply circuit to the normal mode, informing the main controller of the attachment change of the detachable recording medium, and renewing, by the main controller, attachment change information in a memory.

* * * * *